US010933810B2

(12) United States Patent
Lu et al.

(10) Patent No.: US 10,933,810 B2
(45) Date of Patent: Mar. 2, 2021

(54) SURROUND VIEW VISION SYSTEM THAT UTILIZES TRAILER CAMERA

(71) Applicant: Magna Electronics Inc., Auburn Hills, MI (US)

(72) Inventors: Yuesheng Lu, Farmington Hills, MI (US); Krishna Koravadi, Rochester Hills, MI (US); Vivek Vaid, South Lyon, MI (US); Joshua G. Windeler, Grand Blanc, MI (US); Heinz A. Mattern, West Bloomfield, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/929,459

(22) Filed: May 4, 2020

(65) Prior Publication Data

US 2020/0262346 A1 Aug. 20, 2020

Related U.S. Application Data

(63) Continuation of application No. 16/364,274, filed on Mar. 26, 2019, now Pat. No. 10,640,042.

(60) Provisional application No. 62/736,156, filed on Sep. 25, 2018, provisional application No. 62/649,866, filed on Mar. 29, 2018.

(51) Int. Cl.
| | |
|---|---|
| *H04N 7/18* | (2006.01) |
| *B60R 1/00* | (2006.01) |
| *H04N 5/247* | (2006.01) |
| *H04N 13/351* | (2018.01) |
| *H04N 13/282* | (2018.01) |

(52) U.S. Cl.
CPC ............... *B60R 1/00* (2013.01); *H04N 5/247* (2013.01); *H04N 7/183* (2013.01); *H04N 13/282* (2018.05); *H04N 13/351* (2018.05); *B60R 2300/105* (2013.01); *B60R 2300/303* (2013.01)

(58) Field of Classification Search
CPC ................ B60R 1/00; B60R 2300/105; B60R 2300/802; B60R 2300/303; B60R 1/003; H04N 7/183; H04N 7/181; H04N 5/247; H04N 7/18; H04N 13/282; H04N 13/351
USPC ... 348/36, 39, 118, 122, 139, 142, 148, 153, 348/159; 382/103; 340/461, 435, 903
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 9,499,139 B2 | 11/2016 | Koravadi |

(Continued)

*Primary Examiner* — Sherrie Hsia
(74) *Attorney, Agent, or Firm* — Honigman LLP

(57) ABSTRACT

A vehicular surround vision system includes a plurality of vehicular cameras disposed at a vehicle and having respective exterior fields of view, a trailer camera disposed at a rear of a trailer and having a rearward field of view, an ECU and a display device in the vehicle. With the trailer not hitched to the vehicle and during a driving maneuver of the vehicle, the display device displays surround view video images derived from image data captured by at least the rearward viewing and sideward viewing vehicular cameras and provided to the ECU. With the trailer hitched to the vehicle and during a driving maneuver of the vehicle and trailer, the display device displays surround view video images derived from image data captured by the trailer camera and provided to the ECU and image data captured by at least some of the vehicular cameras and provided to the ECU.

24 Claims, 3 Drawing Sheets

(56) References Cited

U.S. PATENT DOCUMENTS

| | | |
|---|---|---|
| 9,674,490 B2 | 6/2017 | Koravadi |
| 9,688,199 B2 | 6/2017 | Koravadi |
| 9,729,636 B2 | 8/2017 | Koravadi et al. |
| 9,881,220 B2 | 1/2018 | Koravadi |
| 10,640,042 B2 | 5/2020 | Lu et al. |
| 2012/0162427 A1 | 6/2012 | Lynam |
| 2017/0158133 A1 | 6/2017 | Chundrlik, Jr. et al. |
| 2017/0254873 A1 | 9/2017 | Koravadi |
| 2017/0334484 A1 | 11/2017 | Koravadi |
| 2018/0082315 A1 | 3/2018 | Smid et al. |
| 2018/0158337 A1 | 6/2018 | Koravadi |
| 2019/0016264 A1 | 1/2019 | Potnis et al. |
| 2019/0225152 A1 | 7/2019 | Koravadi |
| 2019/0230323 A1 | 7/2019 | Koravadi et al. |

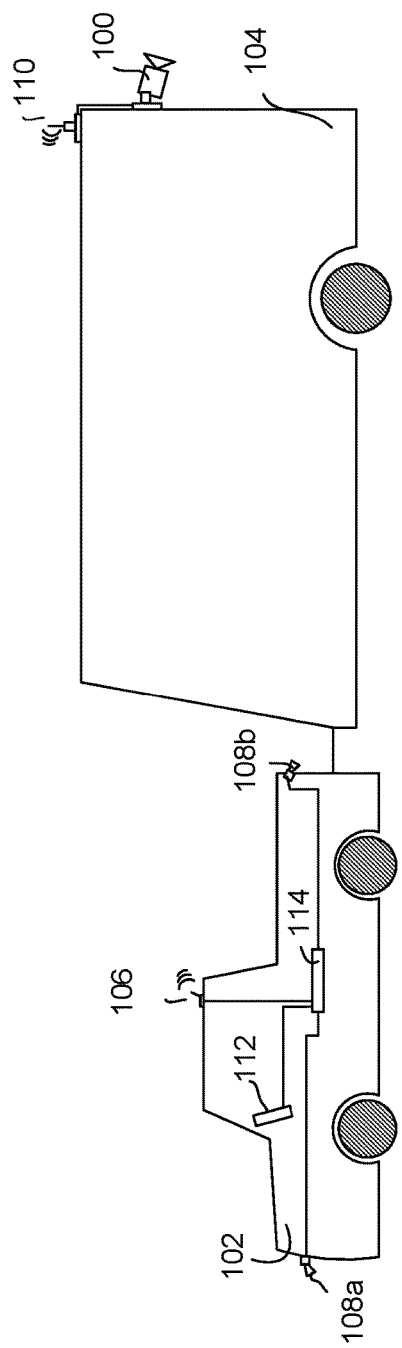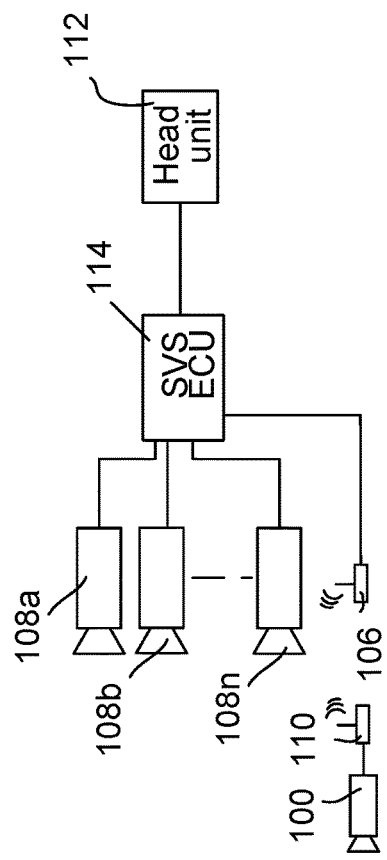

SURROUND VIEW VISION SYSTEM THAT UTILIZES TRAILER CAMERA

CROSS REFERENCE TO RELATED APPLICATIONS

The present application is a continuation of U.S. patent application Ser. No. 16/364,274, filed Mar. 26, 2019, now U.S. Pat. No. 10,640,042, which claims priority of U.S. provisional application Ser. No. 62/736,156, filed Sep. 25, 2018, and U.S. provisional application Ser. No. 62/649,866, filed Mar. 29, 2018, which are hereby incorporated herein by reference in their entireties.

FIELD OF THE INVENTION

The present invention relates generally to a vehicle vision system for a vehicle and, more particularly, to a vehicle vision system that utilizes multiple cameras for a vehicle surround view system.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras to capture image data representative of images exterior of the vehicle, and utilizes a trailer mounted camera to provide a surround view vision system display of the exterior regions surrounding the vehicle and the trailer.

These and other objects, advantages, purposes and features of the present invention will become apparent upon review of the following specification in conjunction with the drawings.

BRIEF DESCRIPTION OF THE DRAWINGS

FIG. 1 is a side view of a vehicle towing a trailer, showing the vehicle with a surround view vision system and showing a wireless camera installed at the rear of the trailer and connected to the surround view system via a wireless link;

FIG. 2 is a system block diagram of the surround view vision system of FIG. 1;

LEGEND

Figure 3:
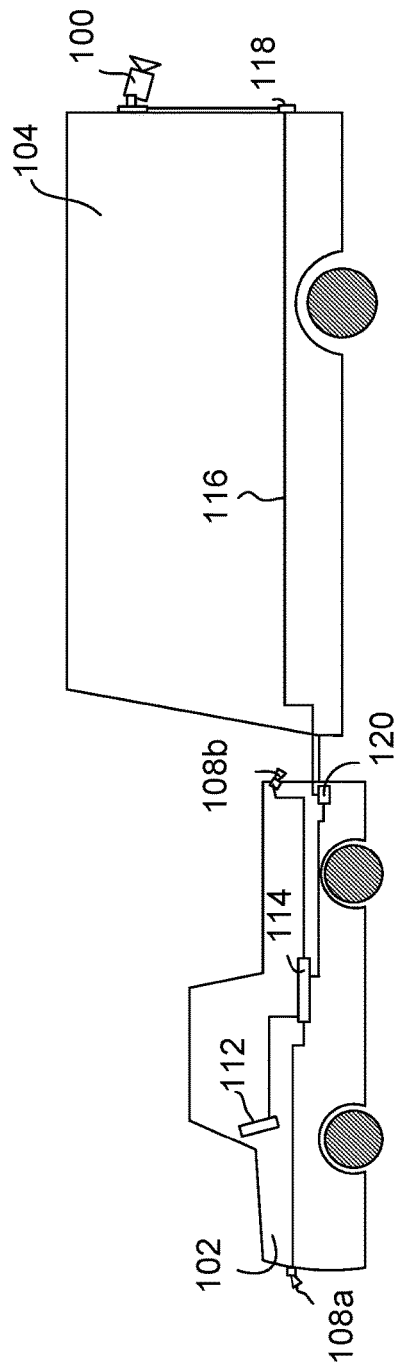
FIG. 3 is a side view of another vehicle towing a trailer, showing the vehicle with a surround view vision system and showing a camera installed at the rear of the trailer with the compressed video communicated to the vehicle ECU via a power line of the trailer.

100—Trailer camera
102—Vehicle towing the trailer
104—Trailer equipped with camera
106—Antenna mounted on the vehicle
108a, b . . . n—Surround view cameras
108a—Backup camera
110—Trailer camera antenna
112—Head unit
114—Surround View System ECU
116—Existing power line in the trailer
118—Trailer powerline module
120—Vehicle powerline module
121—LVDS splitter
123—Serializer
125—Wireless camera extension
124—SOC (system-on-chip)/Processor
122—Wireless chipset/Module
126—External wireless antenna
128—Vehicle power source

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

A surround view vision system for a vehicle 102 includes an electronic control unit (ECU) 114 and a display or head unit 112 at the vehicle. The system includes a plurality of vehicle-mounted cameras 108a, 108b . . . 108n (FIG. 2), which capture image data representative of the area exterior of and surrounding the vehicle and within the respective fields of views of the cameras. Image data captured by the cameras is communicated to the ECU 114a, whereby video images derived from the captured image data are displayed at the display device or head unit 112 for viewing by a driver of the vehicle while maneuvering the vehicle.

As shown in FIG. 1, the vehicle 102 may tow a trailer 104, with a camera 100 mounted on the trailer 104. The camera 100 transmits compressed video data, via an antenna 110 mounted on the trailer 104, to an antenna 106 mounted on the vehicle 102. The antenna 106 is connected to the surround view system ECU 114 (such as via a vehicle communication bus or network or the like). The surround view system ECU 114 processes the image data received via the wireless link and displays the video images on the head unit 112. The displayed video images comprise images derived from image data captured by the front camera 108a and side cameras (and optionally the rear camera 108b) of the vehicle and image data captured by the trailer camera so as to provide a surround view display of the area around the vehicle and trailer.

Figure 4:
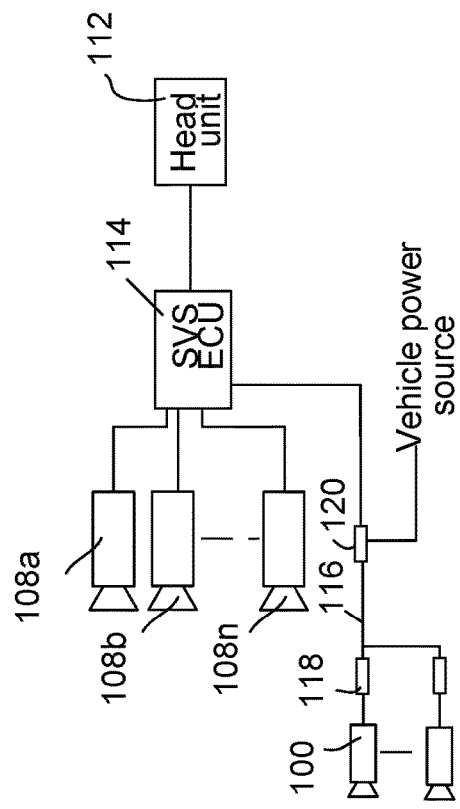
FIG. 4 is a system block diagram of the surround view vision system of FIG. 3.

Optionally, and such as shown in FIGS. 3 and 4, the compressed video from the camera 100 mounted on the trailer 104 may be transmitted via an existing powerline 116 of the trailer, utilizing a communication over powerline module 118, and the transmitted data is received by the surround view system ECU 114 at the vehicle 102 via a communication over powerline module 120 installed at the vehicle 102. The module 120 includes EMI suppression that limits or prevents the interference generated due to communication over powerline to enter the vehicle power line. The electrical connection of the trailer powerline 116 and the vehicle powerline module 120 may be made at a trailer and vehicle harness connection when the trailer is hitched to the vehicle.

Figure 5:
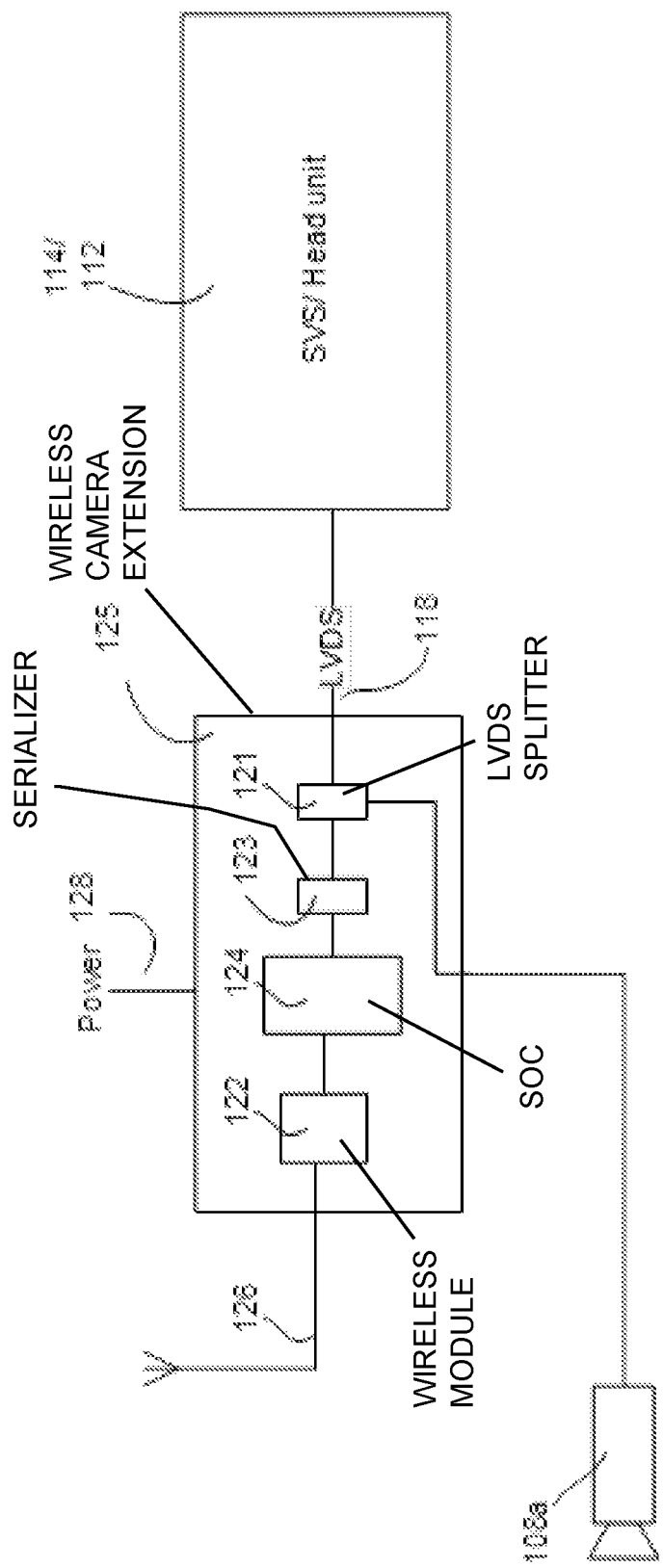
FIG. 5 is a system block diagram of the surround view vision system, showing integration of the wireless camera subsystem into an existing Head unit/SVS unit.

Optionally, and such as shown in FIG. 5, a wireless extension module 125 may be integrated with the head unit 112 or the surround view system 114. The video data is received from the wireless camera 100 via an external wireless antenna 126 and wireless chipset/module 122, and the compressed video data is decompressed using the processor 124 and converted to low-voltage differential signaling (LVDS) via the serializer 123 and then combined with the other video stream from the backup camera 108a (at the LVDS splitter 121) and transmitted to the SVS (surround view system or surround vision system) unit 114 or head unit 112 via the LVDS link 118. The control commands from the head unit 112 are transmitted back to the wireless camera unit 100 via back channel communication using the LVDS link 118.

When no trailer or trailer camera is connected to the system, the ECU processes image data captured by the vehicle cameras (such as a forward camera having a forward field of view, a rearward camera having a rearward field of view, a driver-side camera having a sideward field of view at the driver-side of the vehicle, and a passenger-side camera having a sideward field of view at the passenger-side of the vehicle) to generate the surround view video images for display at the display device. When a trailer is hitched to the vehicle and the trailer camera is in communication with the ECU, the ECU processes image data captured by the trailer camera and by the vehicle cameras (such as a forward camera having a forward field of view, a driver-side camera having a sideward field of view at the driver-side of the vehicle, and a passenger-side camera having a sideward field of view at the passenger-side of the vehicle) to generate the surround view video images for display at the display device. When displaying the surround view of the vehicle and trailer, the ECU may or may not process image data captured by a rearward vehicle camera having a rearward field of view.

Thus, the present invention provides a method and apparatus for streaming video image data from a wireless camera mounted on a trailer and a display on the vehicle head unit (of the vehicle towing the trailer). The wireless camera mounted on the trailer transmits compressed video data via proprietary wireless protocol or standard Wi-Fi protocol to the surround view system installed in the vehicle. The surround view system display that is connected to the head unit displays the streamed video on the head unit. Thus, there is no dependency on the head unit wireless protocol support and the system can utilize proprietary wireless protocols depending on the application need.

Optionally, a plurality of trailer cameras may be disposed at the trailer, the plurality of trailer cameras at least comprising (i) a rear trailer camera disposed at a rear portion of the trailer and having a field of view at least rearward of the trailer, (ii) a left-side trailer camera disposed at a left side of the trailer and having a field of view at least sideward of the trailer and (iii) a right-side trailer camera disposed at a right side of the trailer and having a field of view at least sideward of the trailer. Image data captured by the trailer cameras is provided to the ECU and the display may display video images derived from the captured image data provided to the ECU. The system thus may provide surround view video images at the sides and rear of the trailer.

Optionally, the driver may select the images for display, such as via actuation of a user input or the like in the vehicle, whereby the display screen may display video images derived from image data captured by the rear trailer camera or video images derived from image data captured by the plurality of trailer cameras, depending on the desired view during the driving maneuver of the vehicle and trailer, and the driver may make a selection such that video images derived from image data captured by the vehicle cameras are not displayed along with the displayed video images derived from image data captured by the selected trailer camera or cameras. Optionally, the trailer may only have a rear-mounted and rearward viewing trailer camera, whereby the regions at the sides of the trailer may be encompassed by the respective fields of view of side-mounted vehicle cameras.

Optionally, the camera or cameras mounted on the trailer may transmit the video image data to the surround view system ECU via an existing DC power-over-line that connects to the back of the trailer. The advantage of this approach is that multiple cameras may be installed inside or outside of the trailer and all the video image data could be collected by the demodulator/decoder module that is installed in the vehicle. This is similar to the power line communication method applied to the cameras. When the camera needs to be installed inside the trailer, then the camera is connected to the power line and the communication link is established between the camera and the decoder in the vehicle and the compressed video data is transmitted to the surround view system ECU. Video images representative of the scene inside the trailer and derived from image data captured by the inside camera may be displayed in the vehicle for viewing by a driver or occupant of the vehicle. The inside trailer camera may operate to capture image data responsive to a user input or selection, whereby the display displays video images representative of the image data captured by the inside trailer camera for viewing by the driver or an occupant of the vehicle. When the system is displaying the video images representative of the image data captured by the inside trailer camera, the display does not display video images representative of image data captured by the other cameras.

Optionally, the wireless extension module may be added to the existing surround view system that could extend the capability of the system to connect the trailer wireless camera unit and to stream the video image data to the head unit. Optionally, if the vehicle does not have a surround view system ECU, then the wireless extension module could be added in between the backup camera and the head unit LVDS link. In both cases, a software update may be made to the surround view system as well as to the head unit to control the wireless camera.

The vision system and/or trailer camera or cameras may utilize aspects of the systems and cameras described in U.S. patent applications, Ser. No. 16/364,245, filed Mar. 26, 2019, and published on Oct. 3, 2019 as U.S. Publication No. US-2019-0299862, Ser. No. 16/250,503, filed Jan. 17, 2019, and published on Jul. 25, 2019 as U.S. Publication No. US-2019-0225152, and/or Ser. No. 16/250,480, filed Jan. 17, 2019, and published on Jul. 25, 2019 as U.S. Publication No. US-2019-0230323, which are hereby incorporated herein by reference in their entireties.

The vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447;

6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

Optionally, the display for displaying images captured by one or more of the imaging sensors for viewing by the driver of the vehicle while the driver is normally operating the vehicle, may, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, and/or International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular surround vision system, the vehicular surround vision system comprising:
   a plurality of vehicular cameras disposed at a vehicle and viewing exterior the vehicle;
   wherein the plurality of vehicular cameras comprises (i) a rear vehicular camera disposed at a rear portion of the vehicle and viewing at least rearward of the vehicle, (ii) a left-side vehicular camera disposed at a left side of the vehicle and viewing at least sideward of the left side of the vehicle and (iii) a right-side vehicular camera disposed at a right side of the vehicle and viewing at least sideward of the right side of the vehicle;
   a trailer camera disposed at a rear of a trailer and viewing at least rearward of the trailer;
   wherein the trailer camera is electrically connected to an electrical powerline of the trailer;
   wherein, with the trailer hitched to the vehicle, the electrical powerline of the trailer is electrically connected to a wire harness of the vehicle;
   a display device in the vehicle and viewable by a driver of the vehicle;
   an electronic control unit (ECU) in the vehicle;
   wherein, with the trailer hitched to the vehicle, video image data captured by the trailer camera is provided to the ECU via the electrical powerline of the trailer that is electrically connected to the wire harness of the vehicle;
   wherein, with the trailer hitched to the vehicle, video image data captured by the trailer camera is provided to the ECU via a communication link of the vehicle connecting from the electrical connection made to the wire harness of the vehicle;
   wherein, with the trailer not hitched to the vehicle and during a driving maneuver of the vehicle, (i) image data captured by the plurality of vehicular cameras is provided to the ECU and (ii) the display device displays surround view video images derived from image data captured by at least the rear vehicular camera, the left-side vehicular camera and the right-side vehicular camera and provided to the ECU; and
   wherein, with the trailer hitched to the vehicle and during a driving maneuver of the vehicle and trailer, (i) image data captured by the trailer camera and by the plurality of vehicular cameras is provided to the ECU and (ii) the display device displays surround view video images derived from (a) image data captured by the trailer camera and provided to the ECU and (b) image data captured by at least some of the plurality of vehicular cameras and provided to the ECU.

2. The vehicular surround vision system of claim 1, wherein image data captured by the trailer camera is provided to the ECU using low-voltage differential signaling (LVDS).

3. The vehicular surround vision system of claim 1, wherein image data captured by the rear vehicular camera, the left-side vehicular camera and the right-side vehicular camera is provided to the ECU using low-voltage differential signaling (LVDS).

4. The vehicular surround vision system of claim 1, wherein the rear vehicular camera comprises a rear backup camera of the vehicle.

5. The vehicular surround vision system of claim 1, wherein, with the trailer hitched to the vehicle and during the driving maneuver of the vehicle and trailer, the display device displays surround view video images derived from (a) image data captured by the trailer camera and provided to the ECU, (b) image data captured by the left-side vehicular camera and provided to the ECU and (c) image data captured by the right-side vehicular camera and provided to the ECU.

6. The vehicular surround vision system of claim 5, wherein, with the trailer hitched to the vehicle and during the driving maneuver of the vehicle and trailer, the displayed surround view video images do not include video images derived from image data captured by the rear vehicular camera.

7. The vehicular surround vision system of claim 5, wherein, with the trailer hitched to the vehicle and during the driving maneuver of the vehicle and trailer, the displayed surround view video images include video images derived from image data captured by the rear vehicular camera.

8. The vehicular surround vision system of claim 1, wherein the trailer camera is one of a plurality of trailer cameras disposed at the trailer, and wherein the plurality of trailer cameras further comprises (i) a left-side trailer camera disposed at a left side of the trailer and viewing at least sideward of the left side of the trailer and (ii) a right-side trailer camera disposed at a right side of the trailer and viewing at least sideward of the right side of the trailer.

9. The vehicular surround vision system of claim 8, wherein, with the trailer hitched to the vehicle and during the driving maneuver of the vehicle and trailer, (i) image data captured by the plurality of trailer cameras is provided to the ECU and (ii) the display device displays the surround view video images derived in part from image data captured by the plurality of trailer cameras and provided to the ECU.

10. The vehicular surround vision system of claim 1, wherein display by the display device of video images derived from image data captured by the trailer camera is responsive at least in part to a user input.

11. The vehicular surround vision system of claim 10, wherein the user input is actuated to selectively display by the display device (i) video images derived from image data captured by the trailer camera and provided to the ECU or (ii) surround view video images derived from (a) image data captured by the trailer camera and provided to the ECU and (b) image data captured by at least some of the plurality of vehicular cameras and provided to the ECU.

12. The vehicular surround vision system of claim 1, wherein, with the trailer hitched to the vehicle, image data captured by the trailer camera is provided to a powerline module disposed at the vehicle, and wherein the powerline module receives the provided captured image data and provides the received provided captured image data to the ECU via the communication link of the vehicle.

13. The vehicular surround vision system of claim 1, comprising an interior trailer camera disposed in the trailer and viewing interior the trailer, wherein, with the trailer hitched to the vehicle, image data captured by the interior trailer camera is provided to the ECU via the electrical powerline of the trailer and via the communication link, and wherein, responsive to actuation of a user input in the vehicle, the display device displays video images that are representative of image data captured by the interior trailer camera and provided to the ECU.

14. A vehicular surround vision system, the vehicular surround vision system comprising:
 a plurality of vehicular cameras disposed at a vehicle and viewing exterior the vehicle;
 wherein the plurality of vehicular cameras comprises (i) a rear backup vehicular camera disposed at a rear portion of the vehicle and viewing at least rearward of the vehicle, (ii) a left-side vehicular camera disposed at a left side of the vehicle and viewing at least sideward of the left side of the vehicle and (iii) a right-side vehicular camera disposed at a right side of the vehicle and viewing at least sideward of the right side of the vehicle;
 a trailer camera disposed at a rear of a trailer and viewing at least rearward of the trailer;
 wherein the trailer camera is electrically connected to an electrical powerline of the trailer;
 wherein, with the trailer hitched to the vehicle, the electrical powerline of the trailer is electrically connected to a wire harness of the vehicle;
 a display device in the vehicle and viewable by a driver of the vehicle;
 an electronic control unit (ECU) in the vehicle;
 wherein, with the trailer hitched to the vehicle, video image data captured by the trailer camera is provided to the ECU via the electrical powerline of the trailer that is electrically connected to the wire harness of the vehicle;
 wherein, with the trailer hitched to the vehicle, video image data captured by the trailer camera is provided to the ECU via a communication link of the vehicle connecting from the electrical connection made to the wire harness of the vehicle;
 wherein, with the trailer not hitched to the vehicle and during a driving maneuver of the vehicle, (i) image data captured by the plurality of vehicular cameras is provided to the ECU and (ii) the display device displays surround view video images derived from image data captured by at least the rear backup vehicular camera, the left-side vehicular camera and the right-side vehicular camera and provided to the ECU; and
 wherein, with the trailer hitched to the vehicle and during a driving maneuver of the vehicle and trailer, (i) image data captured by the trailer camera and by the plurality of vehicular cameras is provided to the ECU and (ii) the display device displays surround view video images derived from at least (a) image data captured by the trailer camera and provided to the ECU, (b) image data captured by the left-side vehicular camera and provided to the ECU and (c) image data captured by the right-side vehicular camera and provided to the ECU.

15. The vehicular surround vision system of claim 14, wherein image data captured by the trailer camera is provided to the ECU using low-voltage differential signaling (LVDS).

16. The vehicular surround vision system of claim 14, wherein image data captured by the rear backup vehicular camera, the left-side vehicular camera and the right-side vehicular camera is provided to the ECU using low-voltage differential signaling (LVDS).

17. The vehicular surround vision system of claim 14, wherein, with the trailer hitched to the vehicle and during the driving maneuver of the vehicle and trailer, the displayed surround view video images do not include video images derived from image data captured by the rear backup vehicular camera.

18. The vehicular surround vision system of claim 14, wherein, with the trailer hitched to the vehicle and during the driving maneuver of the vehicle and trailer, the displayed surround view video images include video images derived from image data captured by the rear backup vehicular camera.

19. The vehicular surround vision system of claim 14, wherein display by the display device of video images derived from image data captured by the trailer camera is responsive at least in part to a user input.

20. The vehicular surround vision system of claim 19, wherein the user input is actuated to selectively display by the display device (i) video images derived from image data captured by the trailer camera and provided to the ECU or (ii) surround view video images derived from at least (a) image data captured by the trailer camera and provided to the ECU, (b) image data captured by the left-side vehicular camera and provided to the ECU and (c) image data captured by the right-side vehicular camera and provided to the ECU.

21. A vehicular surround vision system, the vehicular surround vision system comprising:
 a plurality of vehicular cameras disposed at a vehicle and viewing exterior the vehicle;

wherein the plurality of vehicular cameras comprises (i) a rear vehicular camera disposed at a rear portion of the vehicle and viewing at least rearward of the vehicle, (ii) a left-side vehicular camera disposed at a left side of the vehicle and viewing at least sideward of the left side of the vehicle and (iii) a right-side vehicular camera disposed at a right side of the vehicle and viewing at least sideward of the right side of the vehicle;

a trailer camera disposed at a rear of a trailer and viewing at least rearward of the trailer;

wherein the trailer camera is electrically connected to an electrical powerline of the trailer;

wherein, with the trailer hitched to the vehicle, the electrical powerline of the trailer is electrically connected to a wire harness of the vehicle;

a display device in the vehicle and viewable by a driver of the vehicle;

an electronic control unit (ECU) in the vehicle;

wherein, with the trailer hitched to the vehicle, video image data captured by the trailer camera is provided to the ECU via the electrical powerline of the trailer that is electrically connected to the wire harness of the vehicle;

wherein, with the trailer hitched to the vehicle, video image data captured by the trailer camera is provided to the ECU via a communication link of the vehicle connecting from the electrical connection made to the wire harness of the vehicle;

wherein video image data captured by the trailer camera is provided to the ECU using low-voltage differential signaling (LVDS);

wherein, with the trailer hitched to the vehicle, the display device displays video images derived from image data captured by the trailer camera responsive at least in part to a user input;

wherein, with the trailer not hitched to the vehicle and during a driving maneuver of the vehicle, (i) image data captured by the plurality of vehicular cameras is provided to the ECU using LVDS and (ii) the display device displays surround view video images derived from image data captured by at least the rear vehicular camera, the left-side vehicular camera and the right-side vehicular camera and provided to the ECU; and wherein, with the trailer hitched to the vehicle and during a driving maneuver of the vehicle and trailer, (i) image data captured by the trailer camera and by the plurality of vehicular cameras is provided to the ECU and (ii) the display device displays surround view video images derived from (a) image data captured by the trailer camera and provided to the ECU and (b) image data captured by at least some of the plurality of vehicular cameras and provided to the ECU.

22. The vehicular surround vision system of claim 21, wherein, with the trailer hitched to the vehicle and during the driving maneuver of the vehicle and trailer, the displayed surround view video images do not include video images derived from image data captured by the rear vehicular camera.

23. The vehicular surround vision system of claim 21, wherein, with the trailer hitched to the vehicle and during the driving maneuver of the vehicle and trailer, the displayed surround view video images include video images derived from image data captured by the rear vehicular camera.

24. The vehicular surround vision system of claim 21, wherein the user input is actuated to selectively display by the display device (i) video images derived from image data captured by the trailer camera and provided to the ECU or (ii) surround view video images derived from (a) image data captured by the trailer camera and provided to the ECU and (b) image data captured by at least some of the plurality of vehicular cameras and provided to the ECU.

* * * * *